United States Patent [19]
Porte

[11] 3,990,970
[45] Nov. 9, 1976

[54] ABSORBENT PRODUCTS FOR HYDROCARBONS

[75] Inventor: Pierre Porte, Sainte-Foy-les-Lyon, France

[73] Assignee: Societe Rhodiaceta, Paris, France

[22] Filed: July 25, 1975

[21] Appl. No.: 599,023

Related U.S. Application Data

[63] Continuation of Ser. No. 175,755, Aug. 27, 1971, abandoned, which is a continuation of Ser. No. 888,046, Dec. 24, 1969, abandoned.

[30] Foreign Application Priority Data

Dec. 30, 1968  France .............................. 68.181947

[52] U.S. Cl. .................................... 210/36; 210/40; 210/DIG. 26
[51] Int. Cl.² ............................................ C02B 9/02
[58] Field of Search ................ 210/36, 40, DIG. 21, 210/DIG. 26, DIG. 27; 260/2.5 AY, 2.5 N

[56] References Cited
UNITED STATES PATENTS

| | | | |
|---|---|---|---|
| 2,783,894 | 3/1957 | Lovell et al. ..................... | 260/2.5 N |
| 3,215,623 | 11/1965 | Hix ...................................... | 210/40 |
| 3,352,778 | 11/1967 | Brink et al. .......................... | 210/40 |
| 3,464,920 | 9/1969 | Pirson et al. ......................... | 210/36 |
| 3,492,154 | 1/1970 | Eirstman ......................... | 260/2.5 AY |
| 3,536,616 | 10/1970 | Kondoh et al. ....................... | 210/40 |
| 3,591,524 | 7/1971 | Eriksen et al. ....................... | 210/40 |

FOREIGN PATENTS OR APPLICATIONS

| | | | |
|---|---|---|---|
| 573,408 | 11/1945 | United Kingdom .......... | 210/DIG. 21 |

*Primary Examiner*—Thomas G. Wyse
*Attorney, Agent, or Firm*—Stevens, Davis, Miller & Mosher

[57] ABSTRACT

A pulp, i.e. an amorphous mass obtained by precipitation by means of a non-solvent, of an artificial or synthetic polymer, preferably a polyamide or polyester, is used as an absorbent for oil floating on water. Advantageously the pulp is coated with 1 to 5% of its weight of a hydrophobic and oleophilic material, especially a long chain paraffin or chlorinated paraffin.

2 Claims, No Drawings

ABSORBENT PRODUCTS FOR HYDROCARBONS

This is a Continuation of application Ser. No. 175,755 filed Aug. 27, 1971, now abandoned, which in turn is a continuation of Ser. No. 888,046, filed Dec. 24, 1969, now abandoned.

The present invention relates to a product based on polymeric materials which possesses absorbent properties for hydrocarbons.

In the text which follows the ratio of the weight of hydrocarbon absorbed to the weight of absorbent, both in the same units, will be designated as the "absorbency".

It is known to absorb and agglomerate petroleum products spread on the surface of expanses of water by throwing onto these products solid particles in the form of sawdust or wood flour, scrap pine bark or cellulose wadding. These products have an absorbency restricted to 2 and do not selectively absorb the petroleum products but also carry a large amount of water with them. Furthermore, once they have become soaked with water, they lose their absorbency completely, so that their practical utility is largely restricted to thick and compact layers of oil, and they are of little use for treating thin films or drops floating on water.

More recently, materials consisting of granular plastic foams have been proposed for absorbing organic liquids. The absorbency of such foams can be as high as 15.

Though these materials represent an undoubted advance over the materials previously used, they suffer from several disadvantages; in particular their high absorbency is only achieved if they are granulated, which requires an additional operation to be carried out on the crude manufactured foam, and also because of their high volume, it is necessary to compress them in order to transport them economically, and this requires a packaging operation.

The present invention aims to remedy these disadvantages. In one aspect the invention consists in a new organic material which is absorbent towards liquid hydrocarbons and essentially consists of pulp based on a polymeric material. More particularly, it consists in such material which generally has an apparent density between 0.01 and 0.5, preferably between 0.04 and 0.2, and a specific surface area which when determined by measurement of specific surface areas by adsorption of a gas, the so-called Brunauer Emmet Teller (B.E.T.) method, is between 2 and 25 $m^2/g$, preferably between 2 and 12 $m^2/g$. Preferably, this pulp is coated with 1–5% of its weight of a water-repellent and oleophilic compound.

By "pulp" is meant an amorphous product obtained by precipitation of a polymeric material from its solution in a solvent, in a bath essentially containing a non-solvent for the polymeric material which is miscible with the solvent used, the pulp thereafter being freed of the solvent and of the non-solvent.

By "polymeric material" is meant either a homopolymer or a copolymer, or a mixture of polymers.

Suitable polymers include artificial cellulosic compounds such as cellulose acetate and triacetate, (but not products based on native or regenerated cellulose) and synthetic polymers amongst which polyamides and polyesters are preferred, though polymers such as polyolefines, in particular polyethylene, vinyl polymers, especially polyvinyl chloride and chlorinated polyvinyl chloride, and copolymers of vinyl chloride and vinyl acetate also give good results.

The water-repellent and oleophilic material, with which it is advantageous to treat the pulps is preferably an unsubstituted or chlorinated paraffin containing more than 15 carbon atoms in the molecule, or a mixture of such compounds.

Several methods which are in themselves known can be employed for the manufacture of the pulps.

For example a solution of the polymeric material can be run, while stirring, into a bath which essentially comprises a non-solvent for the polymeric material, and the resulting pulp filtered off, suction-drained, washed and dried.

In another method the pulp can be prepared continuously by injecting a stream of a solution of the polymeric material into a stream of non-solvent, collecting the resulting pulp in the form of a slub on a conveyor belt, and draining, washing, suction-draining, drying, and finally coarsely disintegrating the slub.

In a preferred embodiment of the invention, the pulps are thereafter treated so that they carry on their surface 1 to 5% of their weight of a water-repellent and oleophilic material as described above. This treatment, which is in itself known, does not basically change the absorbency of the pulp, but improves the selectivity of its absorbent properties towards hydrocarbons.

Because of their absorbency towards hydrocarbons, which is very high, e.g. 20 or even more, and their good absorption selectivity, the pulps of the invention are of great interest and great efficiency for the absorption and agglomeration of layers of petroleum products spread on the surface of seas, oceans and waterways. For this purpose, they can be packed either in the form of slubs in threads, or in the form of bricks, the pulp being held together by agglomeration by means of, for example, a phenolic binder.

The following Examples illustrate the invention.

EXAMPLE 1

A polyhexamethylene adipamide is dissolved at the rate of 10% by weight of solid in 98% concentration sulphuric acid whilst stirring for 5 hours. The resulting solution is run, with stirring, into a bath of aqueous sodium hydroxide. The resulting pulp is filtered off, washed at ordinary temperature, suction-drained, and then dried to constant weight. The dry white pulp has an apparent density of 0.06.

A sample of this pulp is thrown into a layer of crude Sahara-type petroleum which is on the surface of water contained in a receptacle. It is found that the amount of petroleum absorbed varies depending on whether the pulp is dropped on the layer of petroleum or on the water. In the first case, it absorbs the petroleum rapidly, whilst in the second case it absorbs mainly water and very little petroleum.

Another sample of the crude pulp is impregnated with a solution in low-boiling petrol of a paraffin which is solid at ordinary temperature. After drying, the pulp has retained 4% by weight of paraffin.

10 g. of pulp are taken from the treated sample and thrown, as described above, on a layer of 50 g. of crude Sahara-type petroleum, which is about 1 millimeter thick. Absorption is immediate and complete.

If the experiment is repeated using 10 g. of pulp treated with an aqueous silicone oil emulsion, the resulting pulp absorbs neither water nor petroleum.

EXAMPLE 2

10 g. of pulp, prepared and rendered water-repellent with paraffin as in Example 1, are thrown into a receptacle containing water on the surface of which there is a layer of 300 g. of mazut (petroleum residue) of viscosity 8 centipoises at 25° C, the thickness of the layer being about 1 millimeter. The pulp is instantaneously saturated with the mazut. The saturated pulp is weighed. It is found from the difference between the weights of the initial and the saturated pulp the pulp has absorbed 200 g. of mazut, corresponding to an absorbency of 20.

EXAMPLE 3

A polyethylene glycol terephthalate is dissolved at the rate of 10% by weight in 98% strength sulphuric acid while stirring for 5 hours. The polymer is precipitated by running its solution into water. The resulting pulp is filtered off, washed at ordinary temperature, suction-drained and then dried to constant weight. This dry pulp has an apparent density of 0.09.

20 g. of this pulp are treated with paraffin in the same manner as in Example 1. The pulp retains 3.5% by weight of paraffin.

When this pulp is thrown on a layer of mazut of viscosity 8 centipoises at 25° C., which is about 1 millimeter thick it retains 200 g. of mazut, corresponding to an absorbency of 10.

EXAMPLE 4

Low pressure polyethylene having a melting point of about 130° C., is dissolved at the rate of 5% by weight in decalin at a temperature of 105° C., while stirring. The solution is poured into ethanol while stirring. The resulting pulp is filtered off, washed at ordinary temperature, suction-drained and then dried to constant weight.

This dry product is deposited on a layer of 30 g. of a mixture of 60% by weight of gas oil and 40% of mazut 2, located on the surface of 500 cm$^3$ of water in a beaker of capacity 1 liter. Further product is deposited until the hydrocarbon mixture has been completely absorbed; it is found that the 30 g. of hydrocarbon is completely absorbed by 8 g. of pulp, corresponding to an absorbency of about 4.

If the experiment is repeated with a powder of the same polymer, it is found that it requires 30 g. of this powder to absorb the 30 g. of hydrocarbon, representing an absorbency of only 1.

EXAMPLE 5

Polyvinyl chloride pulp is prepared by the method of Example 4 from a 3% by weight solution of this polymer in dioxane, the precipitation being carried out in ethanol. A very similar product is obtained from a 3% solution of the same polymer in dimethylformamide.

The absorption experiment of the preceding Example is repeated with the pulps obtained: it is found that total absorption is achieved by depositing 4.5 g. of pulp, which corresponds to an absorbency a little less than 7.

I claim:

1. A method of absorbing liquid hydrocarbons spread on the surface of expanses of water, which consists of depositing thereon an organic material which is absorbent towards liquid hydrocarbons, which consists essentially of a pulp of polymeric material selected from the group which consists of polyhexamethylene adipamide and polyethylene glycol terephthalate, the said pulp having an apparent density between 0.01 and 0.5 and a specific surface area between 2 and 25 m$^2$/g. and being an amorphous product obtained by precipitation of a polymeric material from its solution in a solvent in a bath essentially containing a non-solvent for the polymeric material which is miscible with the solvent used, the pulp thereafter being freed of the solvent and of the non-solvent, and removing the absorbent material impregnated with liquid hydrocarbons from the surface of the water.

2. A method according to claim 1, wherein the said pulp is coated with 1 to 5% of its weight of a water-repellant and oleophilic material selected from the group which consists of paraffin hydrocarbons and chlorine-substituted paraffins having more than 15 carbon atoms in the molecule.

* * * * *

UNITED STATES PATENT OFFICE
CERTIFICATE OF CORRECTION

Patent No. 3,990,970                    Dated November 9, 1976

Inventor(s)   Pierre PORTE

It is certified that error appears in the above-identified patent and that said Letters Patent are hereby corrected as shown below:

After "[73] Assignee:", delete "Societa Rhodiaceta, Paris, France", and insert in its place --RHONE-POULENC-TEXTILE, S.A., Paris, France--.

Signed and Sealed this twenty-third Day of August 1977

[SEAL]

Attest:

RUTH C. MASON
Attesting Officer

C. MARSHALL DANN
Commissioner of Patents and Trademarks